(12) United States Patent
Lim et al.

(10) Patent No.: US 11,870,628 B2
(45) Date of Patent: Jan. 9, 2024

(54) TECHNIQUE FOR CONFIGURING PREAMBLE IN WIRELESS COMMUNICATION SYSTEM

(71) Applicant: LG ELECTRONICS INC., Seoul (KR)

(72) Inventors: Dongguk Lim, Seoul (KR); Jinsoo Choi, Seoul (KR); Eunsung Park, Seoul (KR); Jinmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/128,925

(22) Filed: Mar. 30, 2023

(65) Prior Publication Data
US 2023/0239190 A1 Jul. 27, 2023

Related U.S. Application Data

(63) Continuation of application No. 17/623,800, filed as application No. PCT/KR2020/008908 on Jul. 1, 2020.

(30) Foreign Application Priority Data

Jul. 4, 2019 (KR) .......................... 10-2019-0080946

(51) Int. Cl.
*H04L 27/26* (2006.01)
*H04L 5/00* (2006.01)
*H04W 84/12* (2009.01)

(52) U.S. Cl.
CPC ...... *H04L 27/26132* (2021.01); *H04L 5/0048* (2013.01); *H04L 5/0053* (2013.01); *H04L 27/2603* (2021.01); *H04W 84/12* (2013.01)

(58) Field of Classification Search
CPC ..................... H04L 27/2613; H04L 27/26132
See application file for complete search history.

(56) References Cited

U.S. PATENT DOCUMENTS

2012/0287915 A1* 11/2012 Cheong .............. H04W 28/065
370/338
2016/0127948 A1 5/2016 Azizi et al.
(Continued)

FOREIGN PATENT DOCUMENTS

EP 3896929 A1 10/2021
EP 3998752 A1 5/2022
(Continued)

OTHER PUBLICATIONS

D. Lim et al., "Further discussion for 11be preamble", IEEE 802.11-19/1486r1, Sep. 16, 2019.
(Continued)

*Primary Examiner* — Kevin C. Harper
(74) *Attorney, Agent, or Firm* — BRYAN CAVE LEIGHTON PAISNER LLP

(57) ABSTRACT

An example according to the present specification relates to a technique relating to a configuration of a preamble in a wireless LAN (WLAN) system. A reception STA can receive a PPDU. The reception STA can perform a modulo operation with respect to whether or not an L-SIG field is repeated and a value of a length field. The reception STA can determine the received PPDU as an EHT PPDU on the basis of the modulo operation with respect to whether or not the L-SIG field is repeated and the value of the length field.

12 Claims, 25 Drawing Sheets

(56) References Cited

U.S. PATENT DOCUMENTS

| | | | |
|---|---|---|---|
| 2016/0227436 A1 | 8/2016 | Vermani et al. | |
| 2019/0045461 A1 | 2/2019 | Fang et al. | |
| 2019/0097850 A1 | 3/2019 | Kenney et al. | |
| 2019/0116513 A1 | 4/2019 | Verma et al. | |
| 2020/0382998 A1* | 12/2020 | Cao ..................... | H04L 1/0041 |
| 2021/0014788 A1* | 1/2021 | Sahin ..................... | H04L 27/04 |
| 2021/0126755 A1* | 4/2021 | Gan ..................... | H04L 27/2666 |
| 2022/0103408 A1 | 3/2022 | Park et al. | |

FOREIGN PATENT DOCUMENTS

| | | |
|---|---|---|
| JP | 2017539117 A | 12/2017 |
| KR | 10-2017-0066578 A | 6/2017 |

OTHER PUBLICATIONS

M. Park (Intel Corp.), "Further Discussion on Content of BPSK Mark", IEEE Draft, IEEE 802.11-18/-1564r0, Sep. 10, 2018, pp. 1-10 XP068128878.

R. Stacey, "IEEE Draft P802.11ax D0.5", LAN/MAN Standards Committee of the IEEE Computer Society, Oct. 1, 2016, pp. 306-307, XP055429280.

Qualcomm, "Preamble Design Harmonization", doc.: IEEE 802.1119/1021r1, Jun. 26, 2019, pp. 2-4.

* cited by examiner

FIG. 1
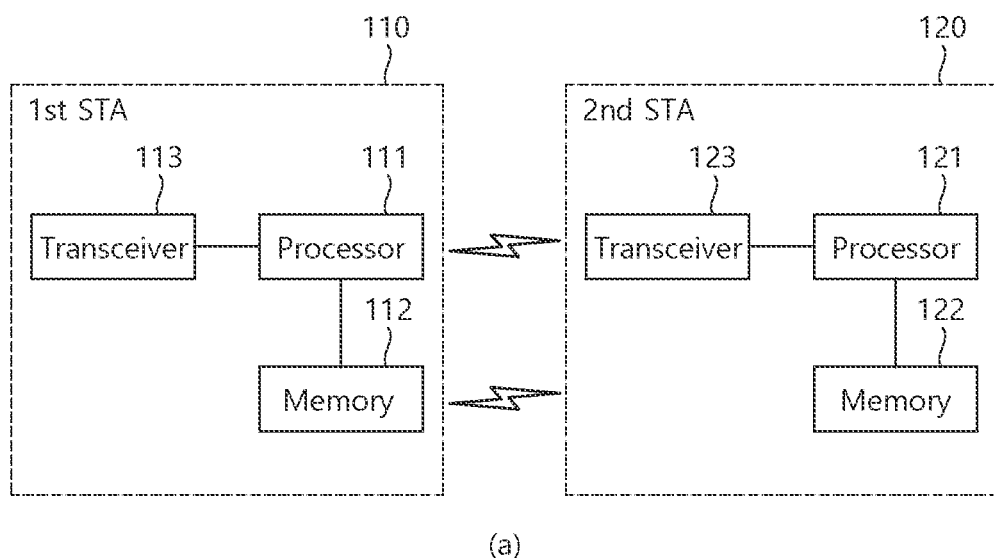
(a)
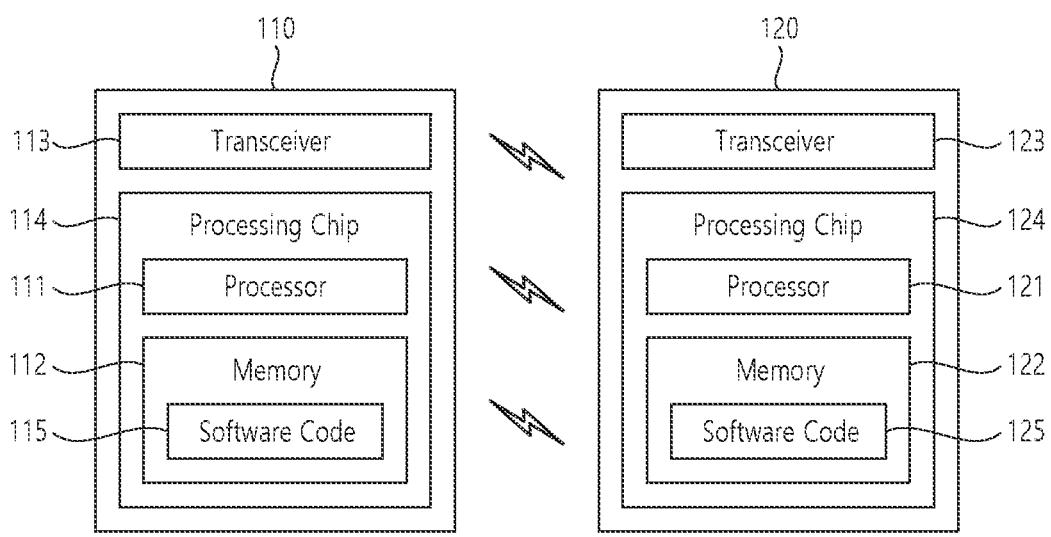
(b)

FIG. 2
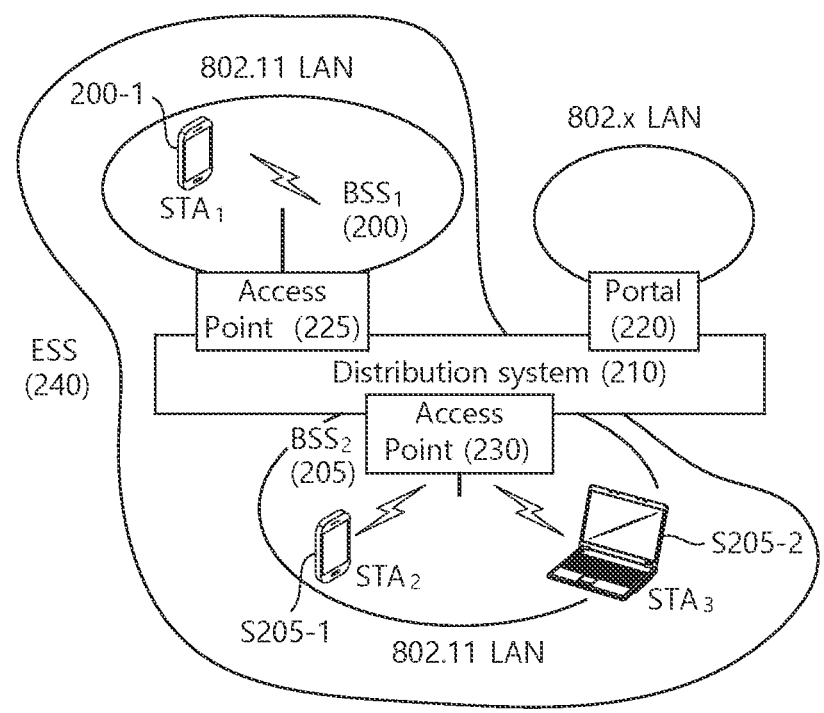
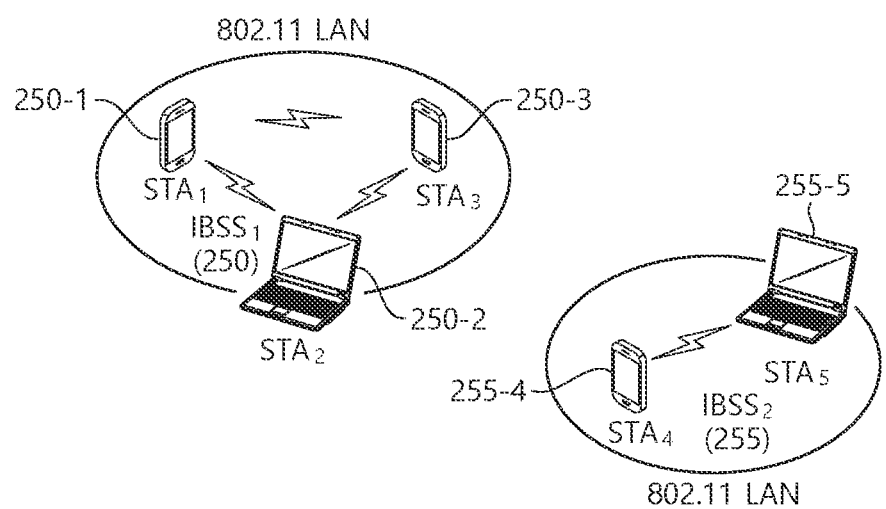

FIG. 4
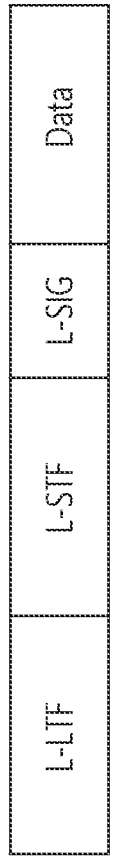
PPDU Format (IEEE 802.11a/g)
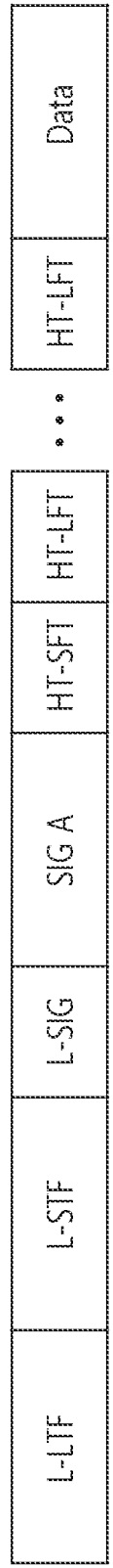
HT PPDU Format (IEEE 802.11n)
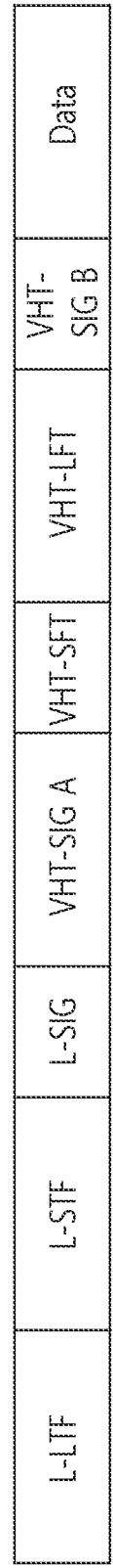
VHT PPDU Format (IEEE 802.11ac)
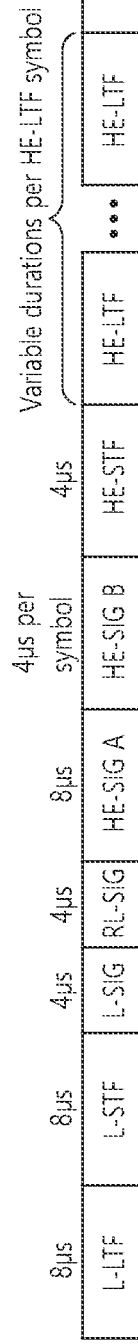

FIG. 21

| L-STF (2110) | L-LTF (2120) | L-SIG (2130) | RL-SIG (2140) | EHT-SIG (2150) | EHT-SIG (2160) | EHT-STF (2170) | EHT-LTF (2180) | EHT-data (2190) |

| L-STF (2210) | L-LTF (2220) | L-SIG (2230) | RL-SIG (2240) | ind_symbol (2250) | ... | EHT-STF (2260) | EHT-LTF (2270) | EHT-data (2280) |

| L-STF (2310) | L-LTF (2320) | L-SIG (2330) | RL-SIG (2340) | EHT-SIG (2350) | EHT-SIG (2360) | ... | EHT-STF (2370) | EHT-LTF (2380) | EHT-data (2390) |

2300

Paket indication inform ← (pointing to EHT-SIG (2350))

TECHNIQUE FOR CONFIGURING PREAMBLE IN WIRELESS COMMUNICATION SYSTEM

CROSS-REFERENCE TO RELATED APPLICATIONS

This application is a Continuation of U.S. patent application Ser. No. 17/623,800, filed on Dec. 29, 2021, which is a National Stage filing under 35 U.S.C. § 371 of International Application No. PCT/KR2020/008608, filed on Jul. 1, 2020, and claims priority to and the benefit of Korean Application No. 10-2019-0080946, filed on Jul. 4, 2019, all of which are incorporated by reference in their entirety herein.

BACKGROUND

Technical Field

The present specification relates to a technique for configuring a preamble in a wireless local area network (WLAN) system and, more particularly, to a method for configuring a preamble in a WLAN system and an apparatus for supporting the same.

Related Art

A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

In an EHT standard, a wide bandwidth (i.e., 160/320 MHz) and 16 streams may be used to support high throughput. Further, when a PPDU based on the EHT standard (e.g., an EHT PPDU) is transmitted, backward compatibility with a device according to a legacy standard (e.g., a conventional Wi-Fi device) may be supported. Therefore, there may be required a method for reducing packet detection errors with respect to a PPDU (or packet) based on the EHT standard.

A receiving STA according to various embodiments may receive a physical protocol data unit (PPDU) including an L-SIG field.

According to various embodiments, the receiving STA may determine the type of the PPDU based on whether the L-SIG field is repeated and a "modulo 3 operation" with respect to the value of a length field.

According to various embodiments, the type of the PPDU may be determined as an extreme high throughput (EHT) type for a PPDU in which the result of the "modulo 3 operation" is "0".

According to various embodiments, the PPDU of the EHT type may include an RL-SIG field in which the L-SIG field is repeated.

According to various embodiments, the receiving STA may decode the PPDU.

According to various embodiments, a receiving STA may determine the type of a PPDU based on whether an L-SIG field is repeated and a modulo operation with respect to the value of a length field. The PPDU may be configured in a different structure for each type. Therefore, the receiving STA may identify whether the L-SIG field is repeated and may perform the modulo operation with respect to the value of the length field in order to identify a PPDU in an EHT format.

Therefore, according to various embodiments, it is possible to reduce packet detection errors by the receiving STA. Further, the EHT PPDU includes the L-SIG field, thus supporting backward compatibility with a conventional Wi-Fi device.

BRIEF DESCRIPTION OF THE DRAWINGS

FIG. 1 illustrates an example of a transmitting apparatus and/or receiving apparatus of the present specification.

FIG. 2 is a conceptual view illustrating the structure of a wireless local area network (WLAN).

FIG. 4 illustrates an example of a PPDU used in an IEEE standard.

FIG. 21 illustrates another format of an EHT PPDU.

FIG. 22 illustrates another format of an EHT PPDU.

FIG. 23 illustrates another format of an EHT PPDU.

DESCRIPTION OF EXEMPLARY EMBODIMENTS

Figure 3:
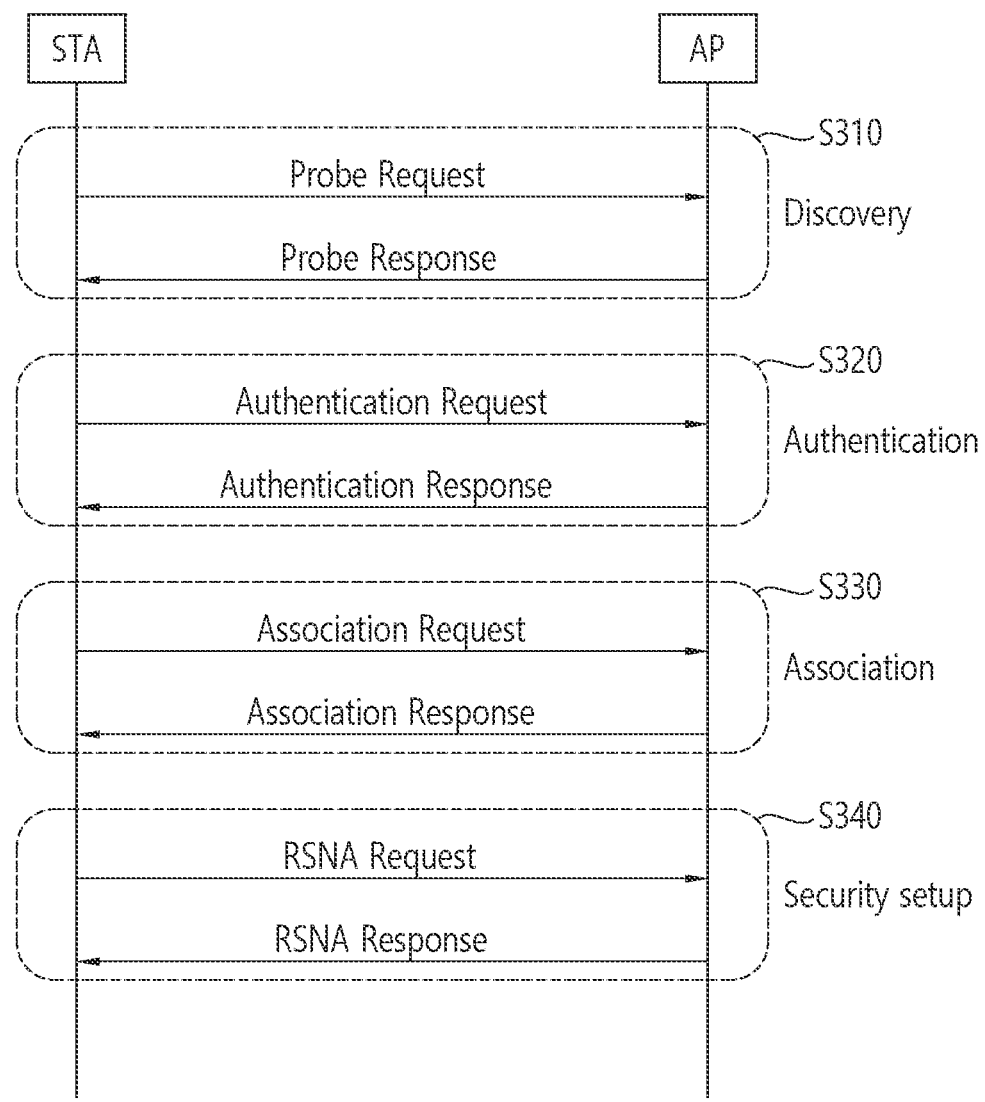
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices, such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AN, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal.

In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (B SS) of institute of electrical and electronic engineers (i.e. EE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (i.e.EE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
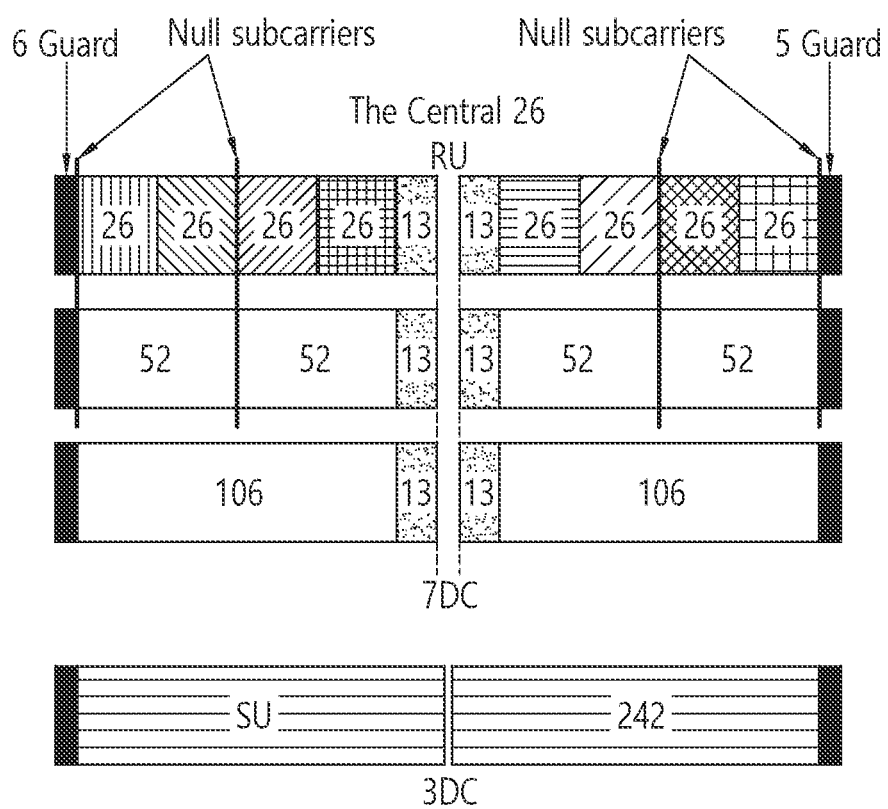
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
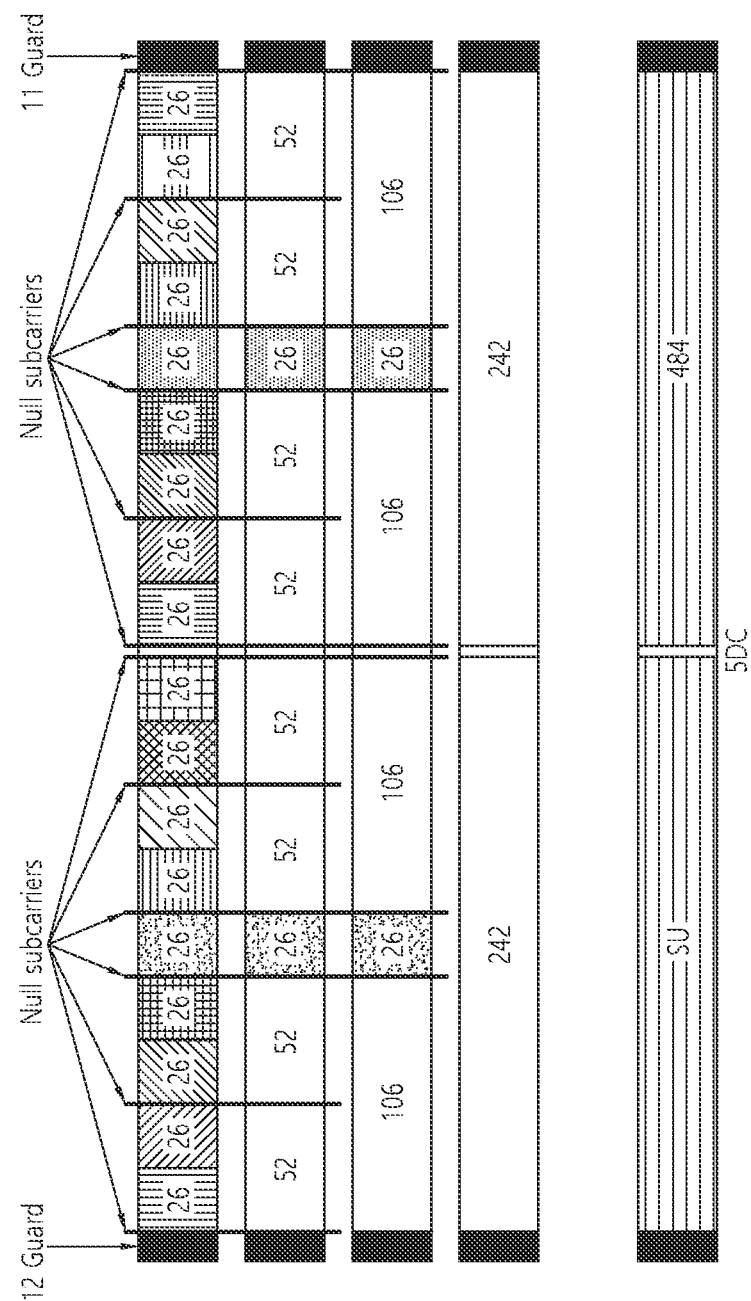
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
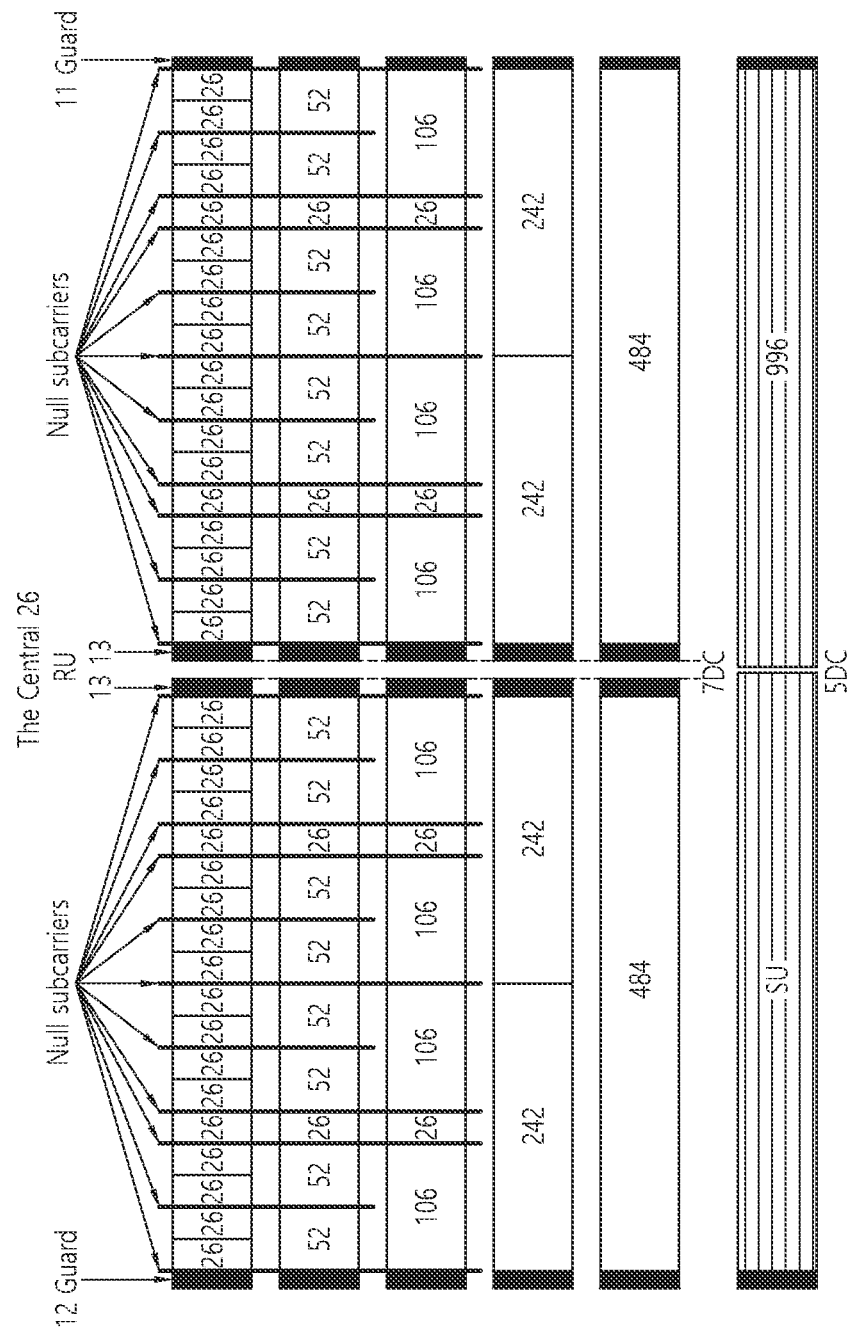
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
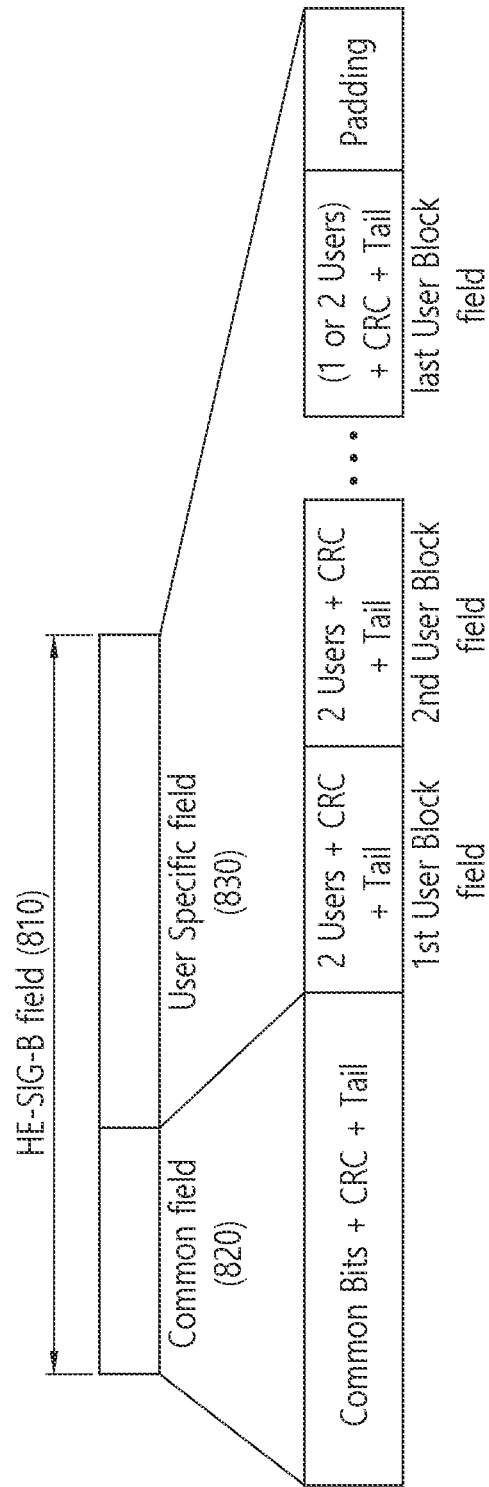
FIG. 8 illustrates the structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 |    | 1 |
| 00000010 | 26 | 26 | 26 | 26 | 26 | 52 |    | 26 | 26 | 1 |
| 00000011 | 26 | 26 | 26 | 26 | 26 | 52 |    | 52 |    | 1 |
| 00000100 | 26 | 26 | 52 |    | 26 | 26 | 26 | 26 | 26 | 1 |
| 00000101 | 26 | 26 | 52 |    | 26 | 26 | 26 | 52 |    | 1 |
| 00000110 | 26 | 26 | 52 |    | 26 | 52 |    | 26 | 26 | 1 |
| 00000111 | 26 | 26 | 52 |    | 26 | 52 |    | 52 |    | 1 |
| 00001000 |    | 52 |    | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | 106 |  | 26 | 26 | 26 | 26 | 26 |  |  | 8 |
| 01001$y_2y_1y_0$ | 106 |  | 26 | 26 | 26 | 52 |    |  |  | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000$y_2y_1y_0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
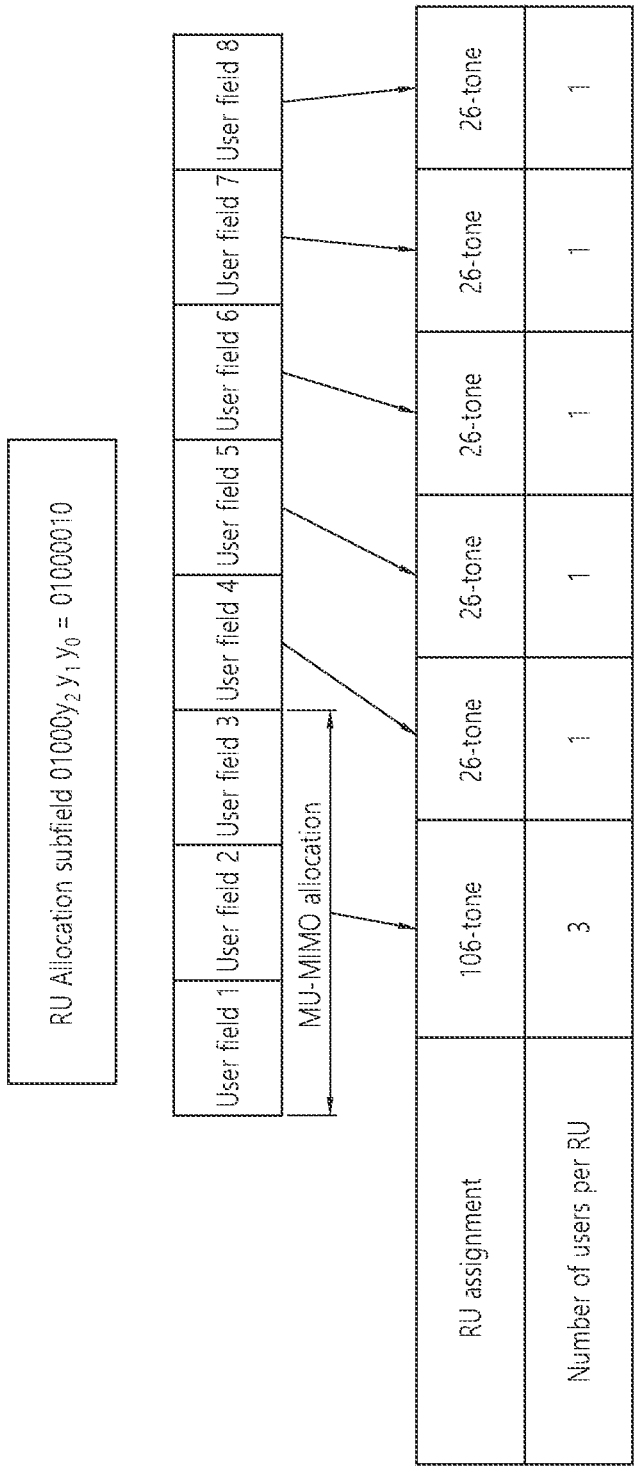
FIG. 9 illustrates an example in which a plurality of user STAs is allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS[3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.).

Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
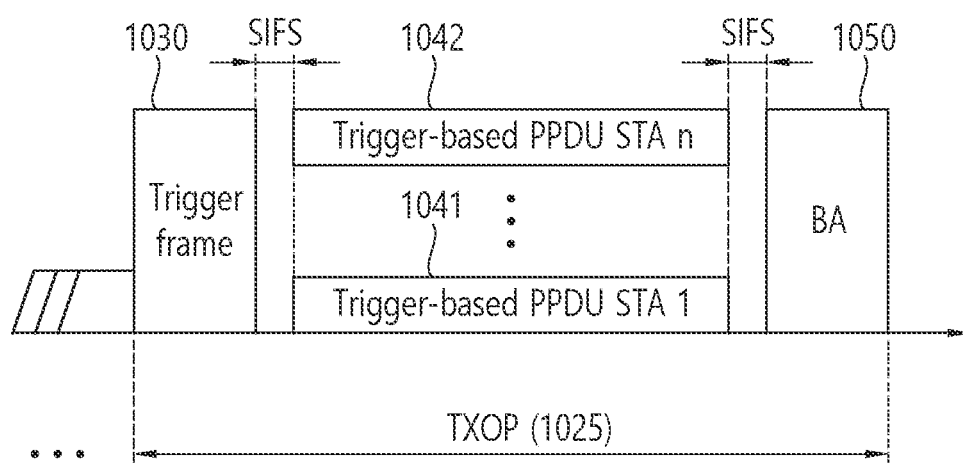
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
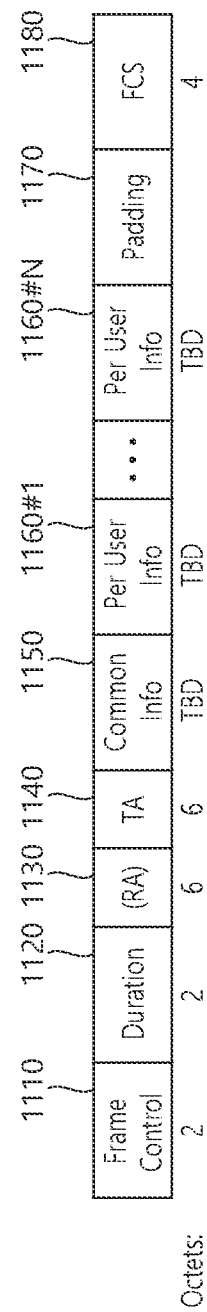
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
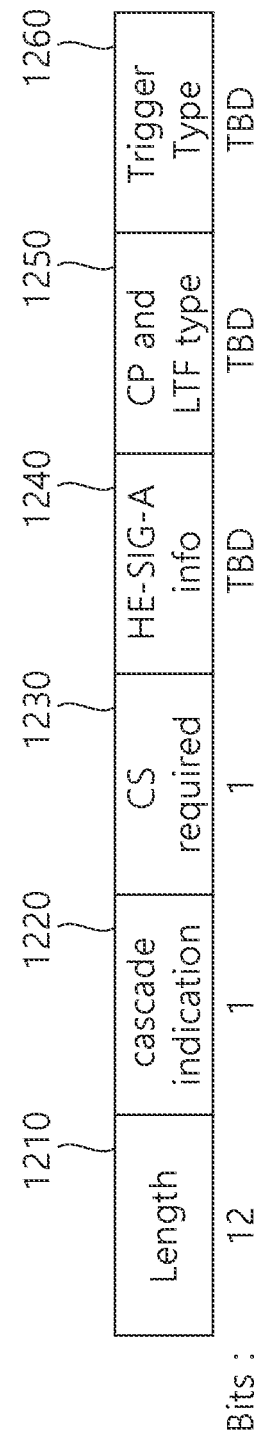
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
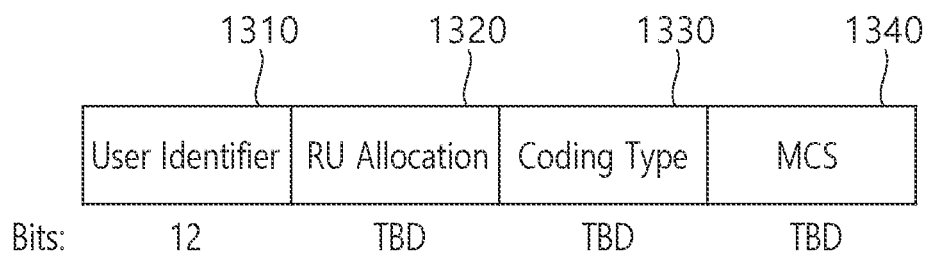
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
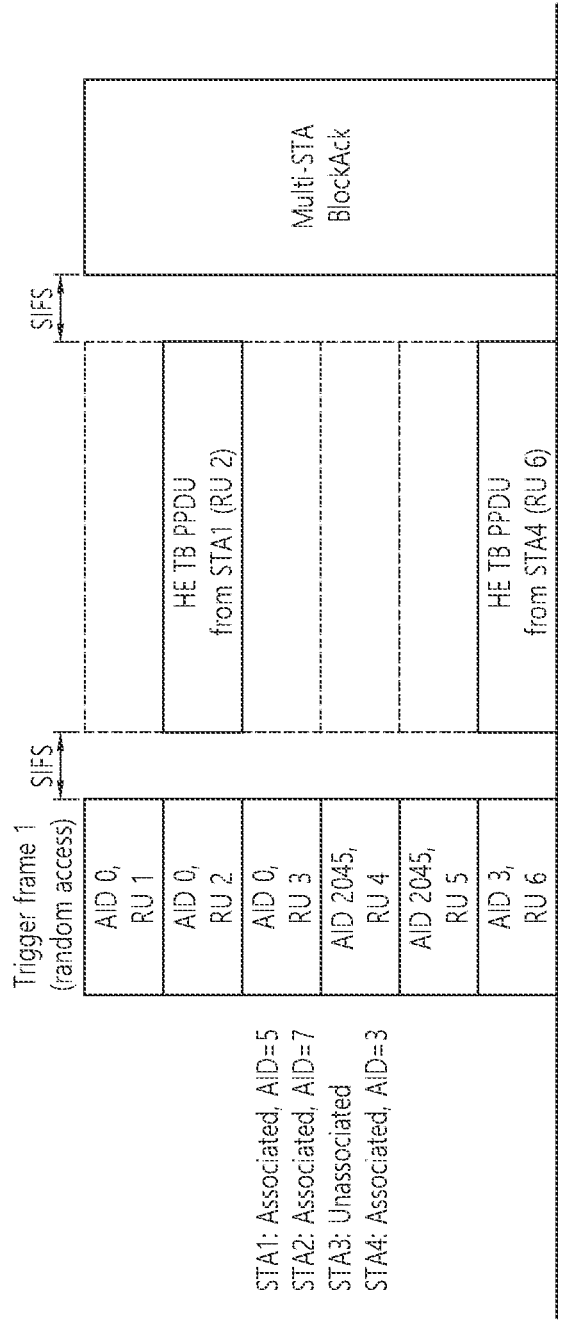
FIG. 14 illustrates a technical feature of a UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
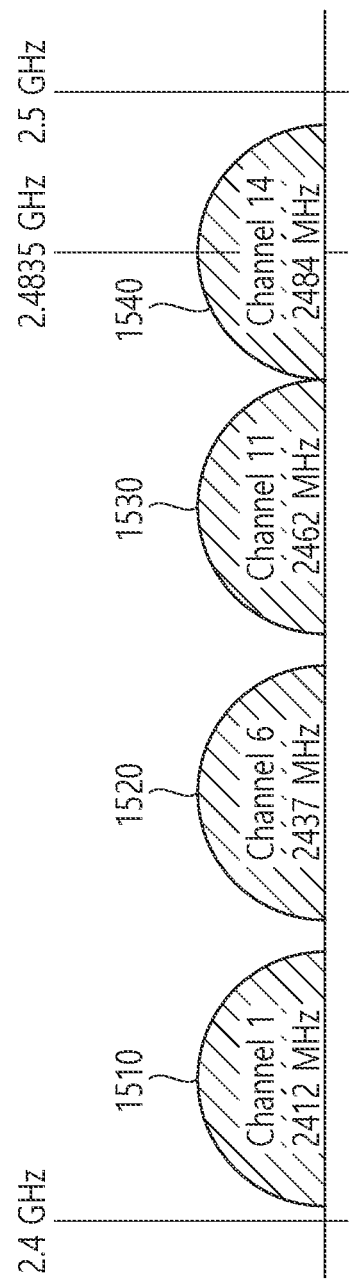
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
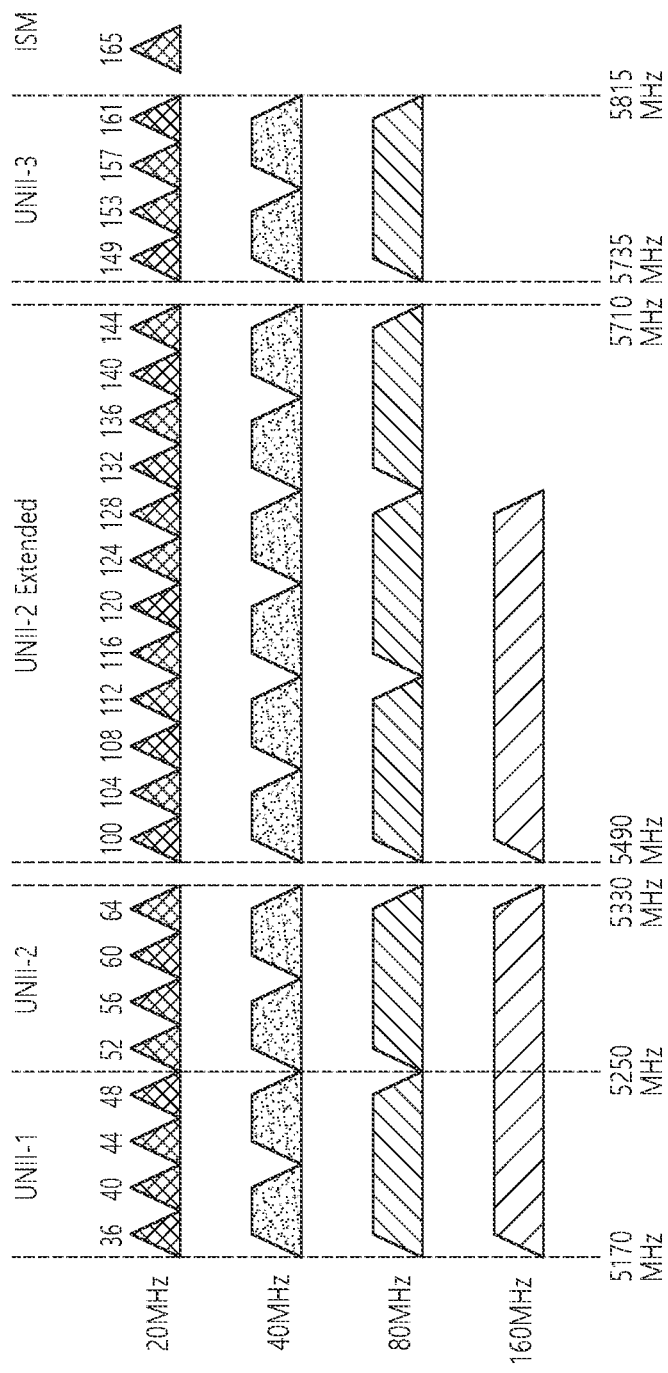
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
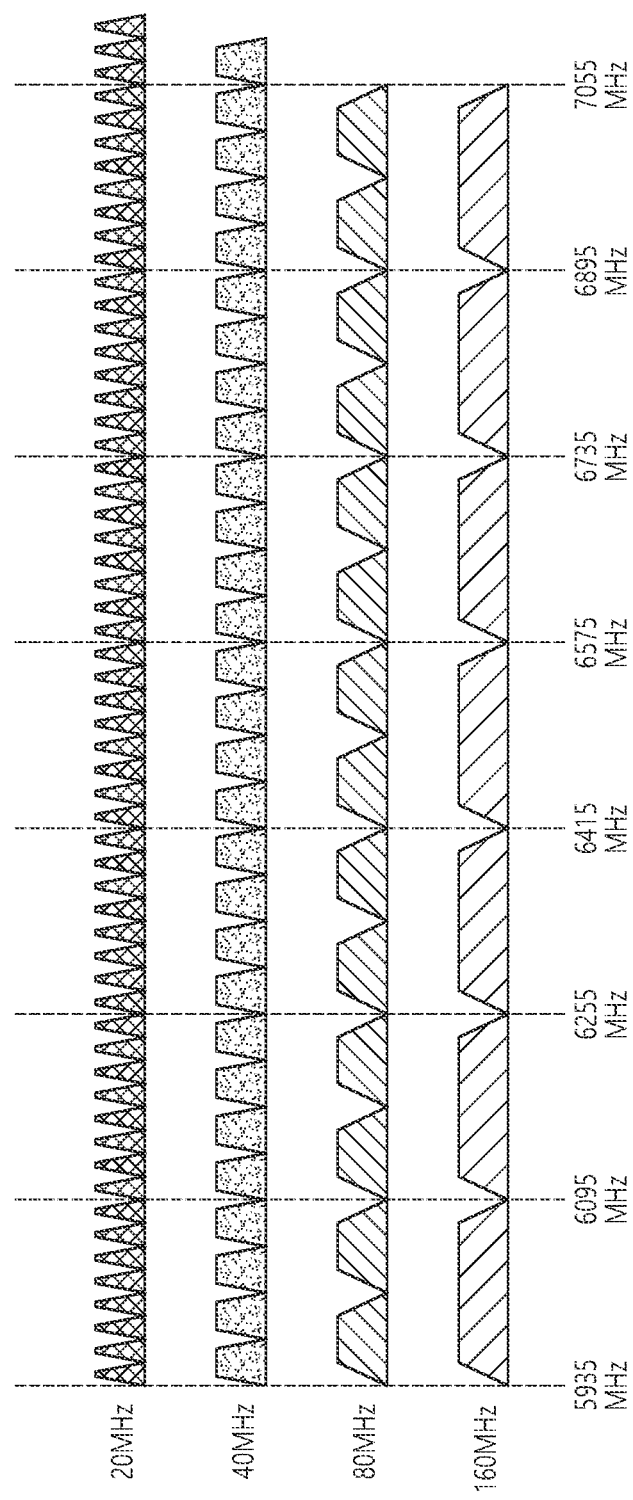
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
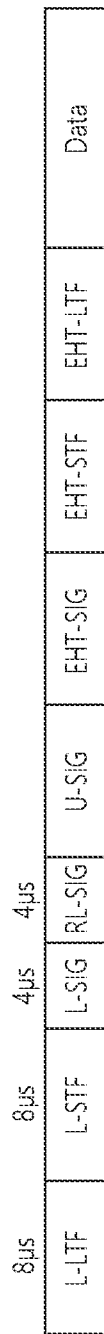
FIG. 18 illustrates an example of a PPDU used in the present specification.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may represent some or all of the PPDU types used in the EHT system. For example, the example of FIG. 18 may be used for both a single-user (SU) mode and a multi-user (MU) mode, or may be used only for the SU mode, or may be used only for the MU mode. For example, a trigger-based PPDU (TB) on the EHT system may be separately defined or configured based on the example of FIG. 18. The trigger frame described through at least one of FIGS. 10 to 14 and the UL-MU operation (e.g., the TB PPDU transmission operation) started by the trigger frame may be directly applied to the EHT system.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTF and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIG may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIG may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information related to whether a dual subcarrier modulation (DCM) scheme is applied to EHT-SIG; 4) a field including information related to the number of symbol used for EHT-SIG; 5) a field including information related to whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include the technical feature of the HE-SIG-B shown in the examples of FIGS. 8 to 9 as it is. The EHT-SIG may be referred to by various names such as a second SIG field, a second SIG, a second type SIG, a control signal, a control signal field, and a second (type) control signal.

The EHT-SIG may include N-bit information (e.g., 1-bit information) related to whether the EHT-PPDU supports the SU mode or the MU mode.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of consecutive tones, and a second modulation scheme may be applied to the remaining half of the consecutive tones. That is, a transmitting STA may use the first modulation scheme to modulate specific control information through a first symbol and allocate it to half of the consecutive tones, and may use the second modulation scheme to modulate the same control information by using a second symbol and allocate it to the remaining half of the consecutive tones. As described above, information (e.g., a 1-bit field) related to whether the DCM scheme is applied to the EHT-SIG may be included in the U-SIG. An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. Hereinafter, an example of a sequence for configuring an EHT-STF (i.e., an EHT-STF sequence) is proposed. The following sequence may be modified in various ways.

The EHT-STF may be configured based on the following sequence M.

$$M=\{-1,-1,-1,1,1,1,-1,1,1,1,-1,1,1,-1,1\} \quad <\text{Equation 1}>$$

The EHT-STF for the 20 MHz PPDU may be configured based on the following equation. The following example may be a first type (i.e., 1×STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$\text{EHT-STF}(-112{:}16{:}112)=\{M\}^*(1+j)/\text{sqrt}(2)$$

$$\text{EHT-STF}(0)=0 \quad <\text{Equation 2}>$$

The EHT-STF for the 40 MHz PPDU may be configured based on the following equation. The following example may be the first type (i.e., 1×STF) sequence.

$$\text{EH-STF}(-240{:}16{:}240)=\{M,0,-M\}^*(1+j)/\text{sqrt}(2) \quad <\text{Equation 3}>$$

The EHT-STF for the 80 MHz PPDU may be configured based on the following equation. The following example may be the first type (i.e., 1×STF) sequence.

$$\text{EHT-STF}(-496{:}16{:}496)=\{M,1,-M,0,-M,1,-M\}^*(1+j)/\text{sqrt}(2) \quad <\text{Equation 4}>$$

The EHT-STF for the 160 MHz PPDU may be configured based on the following equation. The following example may be the first type (i.e., 1×STF) sequence.

$$\text{EHT-STF}(-1008{:}16{:}1008)=\{M,1,-M,0,-M,1,-M,0,-M,-1,M,0,-M,1,-M\}^*(1+j)/\text{sqrt}(2) \quad <\text{Equation 5}>$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$\text{EHT-STF}(-496{:}16{:}496)=\{-M,-1,M,0,-M,1,-M\}^*(1+j)/\text{sqrt}(2) \quad <\text{Equation 6}>$$

Equation 7 to Equation 11 below relate to an example of a second type (i.e., 2×STF) sequence.

$$\text{EHT-STF}(-120{:}8{:}120)=\{M,0,-M\}^*(1+j)/\text{sqrt}(2) \quad <\text{Equation 7}>$$

The EHT-STF for the 40 MHz PPDU may be configured based on the following equation.

$$\text{EHT-STF}(-248{:}8{:}248)=\{M,-1,-M,0,M,-1,M\}^*(1+j)/\text{sqrt}(2)$$

$$\text{EHT-STF}(-248)=0$$

$$\text{EHT-STF}(248)=0 \quad <\text{Equation 8}>$$

The EHT-STF for the 80 MHz PPDU may be configured based on the following equation.

$$\text{EHT-STF}(-504{:}8{:}504)=\{M,-1,M,-1,-M,-1,M,0,-M,1,M,1,-M,1,-M\}^*(1+j)/\text{sqrt}(2) \quad <\text{Equation 9}>$$

The EHT-STF for the 160 MHz PPDU may be configured based on the following equation.

$$\text{EHT-STF}(-1016{:}16{:}1016)=\{M,-1,M,-1,-M,-1,M,0,-M,1,M,1,-M,0,-M,1,-M,1,M,1,-M,0,-M,1,M,1,-M,1,-M\}^*(1+j)/\text{sqrt}(2)$$

$$\text{EHT-STF}(-8)=0, \text{EHT-STF}(8)=0,$$

$$\text{EHT-STF}(-1016)=0, \text{EHT-STF}(1016)=0 \quad <\text{Equation 10}>$$

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

$$\text{EHT-STF}(-504{:}8{:}504)=\{-M,1,-M,1,M,1,-M,0,-M,1,M,1,-M,1,-M\}^*(1+j)/\text{sqrt}(2)$$

$$\text{EHT-STF}(-504)=0,$$

$$\text{EHT-STF}(504)=0 \quad <\text{Equation 11}>$$

The EHT-LTF may have first, second, and third types (i.e., 1×, 2×, 4×LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 μs. In addition, a GI (e.g., 0.8/1/6/3.2 μs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frames, the management frame, and the data frame.

Figure 19:
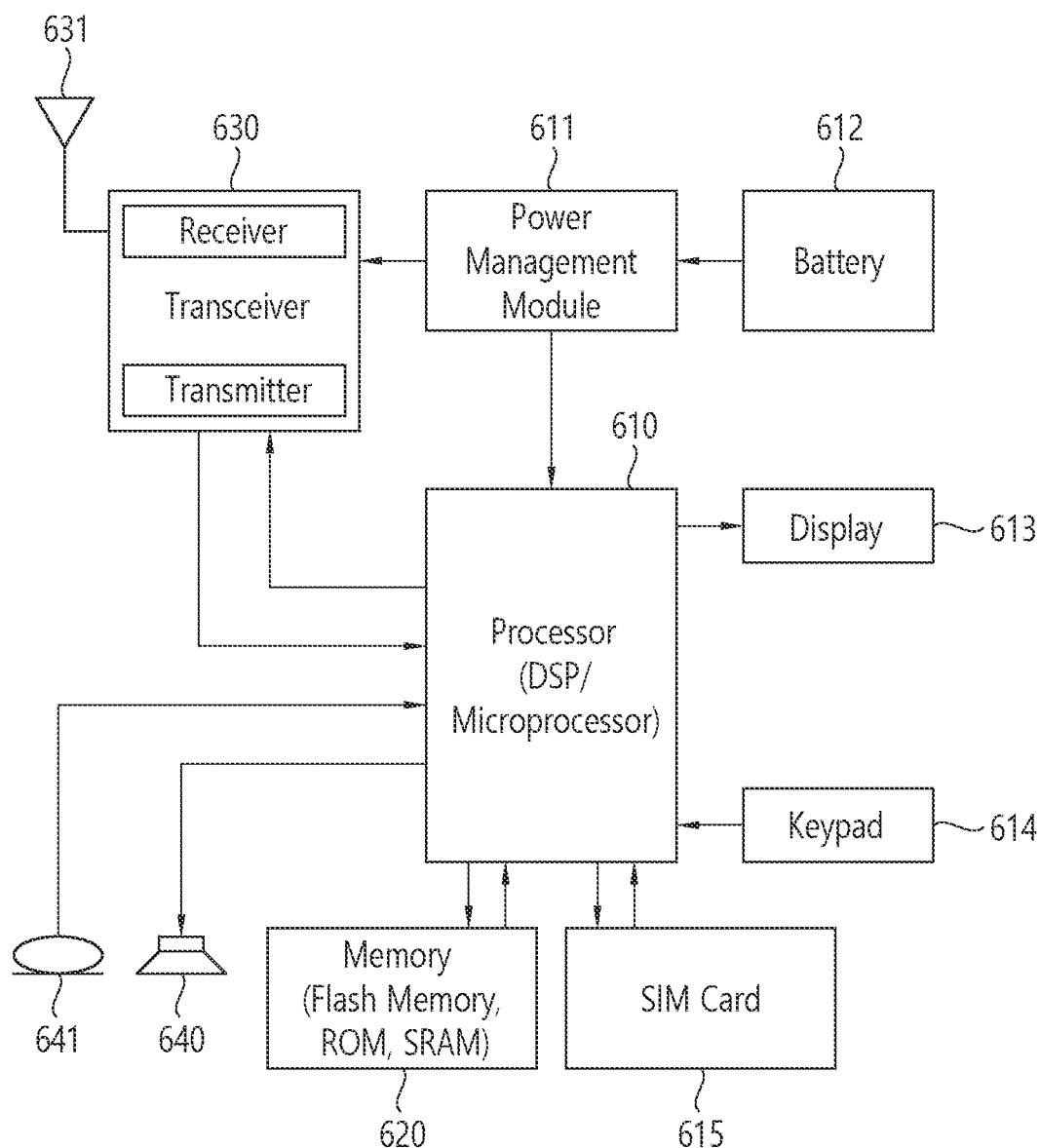
FIG. 19 illustrates an example of a modified transmitting apparatus and/or receiving apparatus of the present specification.

FIG. 19 illustrates an example of a modified transmitting apparatus and/or receiving apparatus of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

In the following specification, an EHT standard or a PPDU according to the EHT standard may be described.

To provide a higher data rate than 802.11ax, the EHT standard may be proposed. The EHT standard may support a wide bandwidth (e.g., a bandwidth of 320 MHz or more), 16 streams, and/or a multi-link (or multi-band) operation. Therefore, to support a transmission method based on the EHT standard, a new frame format may be used. When a signal is transmitted using the new frame format through a 2.4/5/6 GHz band, not only a receiver supporting the EHT standard but also conventional Wi-Fi receivers (or STAs) (e.g., receivers according to 802.11n/ac/ax) may receive the EHT signal (e.g., a wake-up radio (WUR) signal) transmitted through the 2.4/5/6 GHz band. For example, when a conventional Wi-Fi receiver (or STA) falsely detects a received EHT signal (e.g., WUR signal), the conventional Wi-Fi receiver may recognize/identify the received EHT signal as a signal (or packet) transmitted to the conventional Wi-Fi receiver. Accordingly, the conventional Wi-Fi receiver decodes the received EHT signal, and thus power may be wasted.

Hereinafter, when the EHT standard supports backward compatibility with conventional Wi-Fi, an embodiment of configuring an 11be preamble (a preamble based on an 802.11be standard (EHT)) may be proposed to prevent a detection error.

A preamble of a PPDU based on the EHT standard may be variously configured. Hereinafter, an embodiment of configuring a preamble of a PPDU based on the EHT standard may be described. In addition, an embodiment of performing packet indication through a preamble of a PPDU based on the EHT standard may also be described. Hereinafter, a PPDU based on the EHT standard may be described as an EHT PPDU. However, the EHT PPDU is not limited to the EHT standard. The EHT PPDU may include not only a PPDU based on 802.11be (i.e., the EHT standard) but also a PPDU based on a new standard advancing/evolving/extending from 802.11be.

Figure 20:
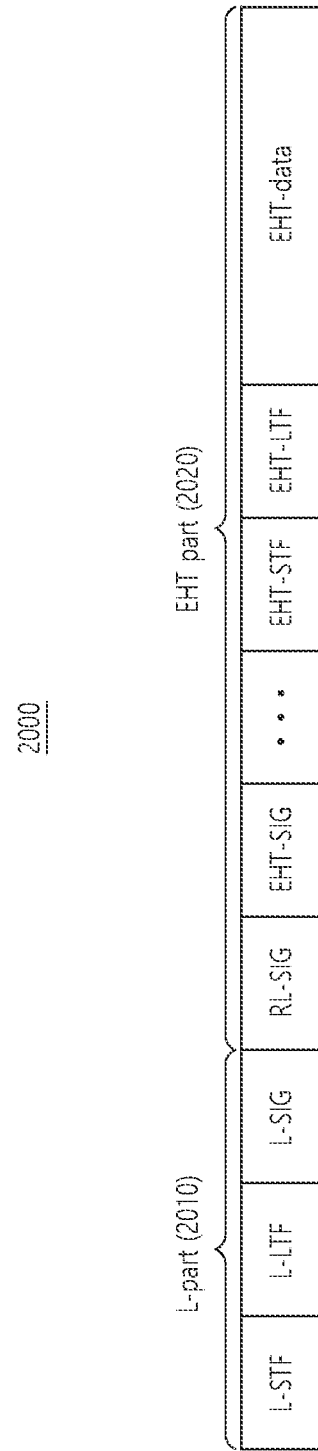
FIG. 20 illustrates a format of an EHT PPDU.

FIG. 20 illustrates a format of an EHT PPDU.

Referring to FIG. 20, an EHT PPDU 2000 may be configured using a frame format of a PPDU based on 802.11ax. The EHT PPDU 2000 may include an L-part 2010 and an EHT part 2020.

The EHT PPDU 2000 may be configured in a structure in which the L-Part 2010 is transmitted first before the EHT part 2020 for coexistence with a legacy STA (STA according to 802.11n/ac/ax).

According to an embodiment, the EHT part 2020 may include an RL-SIG, an EHT control field (e.g., a U-SIG (not shown), an EHT-SIG, an EHT-STF, and/or an EHT-LTF), and an EHT data field.

According to an embodiment, the EHT part 2020 may include an RL-SIG, an early indication symbol (detection symbol), an EHT control field (e.g., a U-SIG (not shown), an EHT-SIG, an EHT-STF, and an EHT-LTF), and an EHT data field.

Although FIG. 20 shows an example in which an RL-SIG is used for a symbol following an L-SIG, the RL-SIG may be referred to by various terms.

Hereinafter, a specific example of a preamble of an EHT PPDU may be described. To support coexistence and backward compatibility with a legacy system (a system according to 802.11n/ac/ax) already operating, an EHT PPDU may be newly configured and be transmitted. In this case, it is possible to reduce false packet detection by a third-party device (e.g., an STA according to 802.11n/ac/ax) through a preamble of the EHT PPDU. In addition, it is possible to perform packet indication for the EHT PPDU through the preamble of the EHT PPDU. For example, a STA supporting the EHT standard (hereinafter, EHT STA) may identify that a received PPDU is a PPDU based on the EHT standard, based on a preamble of the received EHT PPDU. Hereinafter, a specific example of the preamble of the EHT PPDU may be described with reference to first to fifth embodiments.

First Embodiment

According to a first embodiment, in the EHT standard, a frame format according to 802.11ax may be recycled. However, in the EHT standard, 11be packet indication may be performed through the value of a length field. That is, a STA (or a receiving STA) according to the EHT standard may identify that the format of a received PPDU is an EHT PPDU based on the value of the length field.

FIG. 21 illustrates another format of an EHT PPDU.

Referring to FIG. 21, an EHT PPDU 2100 may include an L-STF 2110, an L-LTF 2120, an L-SIG 2130, an RL-SIG 2140, an EHT-SIG 2150, an EHT-SIG 2160, an EHT-STF 2170, an EHT-LTF 2180, and/or an EHT-data 2190. The EHT PPDU 2100 may be related to the PPDU illustrated in FIG. 18. For example, the EHT-SIG 2150 may be related to the U-SIG illustrated in FIG. 18.

According to an embodiment, the EHT PPDU 2100 may include the RL-SIG 2140 in which the L-SIG 2130 is repeated after the L-SIG 2130 as in 802.11ax. In addition, a length field of the L-SIG 2130 and the RL-SIG 2140 in the frame format of the EHT PPDU 2100 may be configured as follows for packet classification.

1. According to an embodiment, the length field may be set to a value satisfying that the remainder is zero when the value of the length field is divided by 3. That is, the value of the length field may be set to a value that produces 0 in a modulo (or modular) operation with 3. The value of the length field may be set using an equation according to 802.11ax. The value of the length field may be set by Equation 13.

$$\text{Length} = \left\lceil \frac{TXTIME - \text{signalextension} - 20}{4} \right\rceil \times 3 - 3 - m, \quad \text{(Equation 13)}$$

$$m = 0$$

Referring to Equation 13, the value of the length field may be set based on the transmission length (TXTIME) of the EHT PPDU 2100. Further, the value of signalextension may be set when signal extension is applied. For example, the value of signalextension may be set to 0 μs in 5 GHz or 6 GHz when signal extension is applied. In addition, the value of signalextension may be set to 6 μs in 2.4 GHz when signal extension is applied. A $\lceil x \rceil$ operation may refer to ceil(x). The $\lceil x \rceil$ operation may refer to a minimum integer equal to or greater than x.

2. According to an embodiment, BPSK modulation may be applied to the L-SIG 2130, the RL-SIG 2140, and/or the EHT-SIGs 2150 and 2160. In addition, the L-SIG 2130, the RL-SIG 2140, and/or the EHT-SIG 2150 and 2160 may be configured by applying BCC 1/2. According to an embodiment, dual carrier modulation (DCM) may be applied to the EHT PPDU 2100.

As described above, the EHT PPDU may be transmitted by setting the value of the length field included in the L-SIG and the RL-SIG to be different from that in 802.11ax. In this case, it is possible to reduce errors of STAs according to 802.11n/ac/ax, which operate in a 5 GHz UNII band, recognizing the EHT PPDU as a frame transmitted to the STAs.

1. An 802.11n STA (hereinafter, 11n STA) may measure constellations of two symbols following the L-SIG for packet classification. In this case, when both of the constellations of the two symbols are QBPSK, the 11n STA may determine the received packet (or PPDU) as a packet thereof (i.e., a PPDU of the 11n standard (hereinafter, 11n PPDU)). Therefore, when an RL-SIG symbol and an EHT-SIG symbol, which are symbols after the L-SIG, in the EHT PPDU are configured with BPSK symbols, the 11n STA does not recognize the constellations of the two symbols as QBPSK when examining the constellations, thus not recognizing the EHT PPDU (or EHT frame) as an 11n PPDU (or 11n frame). Accordingly, when the RL-SIG symbol and the EHT-SIG symbol, which are symbols after the L-SIG, are configured with BPSK symbols, it is possible to prevent the 11n STA from mistaking the EHT PPDU as the 11n PPDU.

2. An 802.11ac STA (hereinafter, 11ac STA) may measure constellations of two symbols following the L-SIG for packet classification. In this case, when the constellations of the two symbols are BPSK and QBPSK, the 11ac STA may determine the received packet (or PPDU) as a packet thereof (i.e., a PPDU of the 11ac standard (hereinafter, 11n PPDU)). Therefore, as described above when the RL-SIG symbol and the EHT-SIG symbol, which are symbols after the L-SIG, in the EHT PPDU are configured with BPSK symbols, it is possible to prevent the 11ac STA from mistaking the EHT PPDU as an 11ac PPDU. That is, when receiving the EHT PPDU, the 11ac STA may identify constellation mapping of the two symbols following the L-SIG. The 11ac STA may identify that the two symbols following the L-SIG are configured with BPSK. Accordingly, the 11ac STA may identify that the constellation mapping of the two symbols (the RL-SIG symbol and the EHT-SIG symbol) does not match constellation mapping of an 11ac PPDU. Accordingly, the 11ac STA may identify that the received PPDU is not an 11ac PPDU.

3. An 802.11ax STA (hereinafter, 11ax STA) may perform a two-step verification process (repetition check and L-SIG content check) for packet classification. First, the 11ax STA may identify/check whether the L-SIG is repeated. Subsequently, when the RL-SIG symbol is transmitted after the L-SIG, the 11ax STA may complete the repetition check.

Next, the 11ax STA may perform the L-SIG content check. For example, the flax STA may identify that the result of applying "modulo 3" to the length field of the L-SIG and the RL-SIG is set to "0". In an flax PPDU (hereinafter, 11ax PPDU), the result of applying "modulo 3" to the length field of the L-SIG and the RL-SIG may be set to "1" or "2". Accordingly, the 11ax STA may identify that the result of performing the L-SIG content check on the received PPDU does not pass. When receiving the EHT PPDU, the 11ax STA may not determine the EHT PPDU as an flax PPDU (or 11ax frame). That is, it is possible to reduce false detection by performing the two-step verification.

As described above, the frame format according to 802.11ax is used as it is for the EHT PPDU, thus simplifying implementation. That is, using the frame format according to 802.11ax is used facilitates implementation. However, since the EHT packet is determined through the content check after passing the repetition check, detection may take a longer time than conventional detection.

4. When receiving the EHT PPDU (or EHT frame), an EHT STA may identify/check whether the L-SIG and the RL-SIG are repeated in the same manner as the 11ax STA. Subsequently, the EHT STA may determine whether the value of the length field of the L-SIG is divisible by 3, thereby determining whether the received PPDU is an EHT PPDU (or EHT frame). In addition, the EHT STA may combine the RL-SIG and the L-SIG and may then determine/decide that the received PPDU is an EHT PPDU (or EHT frame). The EHT STA may improve reception performance of the L-SIG by combining the RL-SIG and the L-SIG. According to an embodiment, the combining process may be performed in terms of time or frequency. For example, the combining process may be performed after fast Fourier transform (FFT) to improve performance.

Second Embodiment

According to a second embodiment, an RL-SIG of an EHT PPDU may be configured by modifying an L-SIG bit or by applying polarization to an RL-SIG.

Similar to the EHT PPDU 2100 illustrated in FIG. 21, in the EHT PPDU, a field following an L-SIG may be configured as the RL-SIG. In addition, the value of a length field of the L-SIG may be set to a value divisible by 3. In this case, an example of the RL-SIG may be described below.

1. A data bit applied to the RL-SIG may be variously configured. For example, the data bit applied to the RL-SIG may be configured using an L-SIG data bit. The data bit applied to the RL-SIG may be configured according to the following embodiments of A to C.

1-A. The data bit applied to the RL-SIG may be configured with a complementary bit of the L-SIG data bit.

1-A-i) For example, 24 data bits of the L-SIG may be configured as {1 1 0 1 1 1 0 1 0 . . . 1 1 0}. Data bits of the RL-SIG may be configured as {0 0 1 0 0 0 1 0 1 . . . 0 0 1}. In this case, the largest Euclidean distance may be set between these two pieces of data.

1-A-ii) For example, when complementary bits are configured, a complementary operation (or complementary process) may be applied only to remaining bits except for the length field of the L-SIG. Therefore, as described above, even if the complementary operation is applied, the value of the length field may be set to be divisible by 3.

1-A-iii) For example, a complementary bit for the length field may also be set to a number divisible by 3. In this case, the RL-SIG may be configured by applying a complementary operation to all bits of the L-SIG.

1-B. The RL-SIG may be configured using a data bit generated through an XOR operation of the data bit of the L-SIG and a designated (or specific) bit or sequence.

1-B-i) For example, the specific bit may be configured with one bit (e.g., 1 or 0). Accordingly, the RL-SIG may be configured using a data bit generated through an XOR operation of the one bit and the L-SIG data bit.

1-B-ii) In another example, the RL-SIG may be configured using a data bit generated/formed through an XOR operation with a 24-bit sequence, a 12-bit sequence, or a sequence including bits of a length corresponding to remaining bits except for the length field.

For example, when the XOR operation is performed based on the 12-bit sequence, the 12-bit sequence may be configured as [1 0 0 0 0 1 0 1 0 1 1 1].

In another example, the sequence of bits except for the length field and the 24-bit sequence may be generated by repeating the 12-bit sequence. In another example, the sequence of bits except for the length field and the-24 bit sequence may be configured with a sequence that minimizes a PAPR.

1-C. Unlike the foregoing embodiment, to configure the RL-SIG, BPSK modulation may be performed on the same data as the L-SIG. Subsequently, each modulated signal may be multiplied by a specific polarization (e.g., −1), thereby configuring RL-SIG.

2. Configuring the RL-SIG through the foregoing embodiment makes it possible to reduce false alarms by legacy STAs (11n/11ac/11ax STAs) when the EHT PPDU (or EHT frame) is transmitted.

2-A. In 802.11n and 802.11ac, all constellations of two symbols following the L-SIG are set to BPSK. Therefore, according to the foregoing embodiment, when an 11n STA and an 11ac STA receive the EHT frame, it is possible to prevent the EHT frame from being falsely detected as an 11n PPDU or an 11ac PPDU. That is, the foregoing embodiment may prevent the 11n STA from erroneously determining the EHT PPDU as the 11n PPDU. In addition, the foregoing embodiment may prevent the 11ac STA from erroneously determining the EHT PPDU as the 11ac PPDU.

2-B. When receiving the EHT PPDU, an 11ax STA may identify, through a repetition check, that the RL-SIG is not configured with the same bit as the L-SIG or is configured by applying a different polarization. That is, in the 11ax STA, the EHT PPDU may not pass the repetition check. Accordingly, it is possible to reduce an error of the 11ax STA determining the EHT PPDU as an 11ax PPDU. In addition, since the value of the length field of the L-SIG is set to a value divisible by 3, even though the EHT PPDU passes the repetition check, the 11ax STA may determine that the EHT PPDU is not an 11ax PPDU in a content check. Accordingly, it is possible to reduce false detection errors of the 11ax STA.

Third Embodiment

According to a third embodiment, an EHT PPDU (or EHT frame) may be configured to include a symbol including information related to a frame format after an RL-SIG.

FIG. 22 illustrates another format of an EHT PPDU.

Referring to FIG. 22, an EHT PPDU 2200 may include an L-STF 2210, an L-LTF 2220, an L-SIG 2230, an RL-SIG 2240, an Ind_symbol 2250, an EHT-STF 2260, an EHT-LTF 2270, and/or an EHT-data 2280. The EHT PPDU 2200 may be related to the PPDU illustrated in FIG. 18. The Ind_symbol 2250 may be related to the U-SIG illustrated in FIG. 18.

According to an embodiment, the value of a length field of the L-SIG 2230 may be set to a value divisible by 3. That is, the value of the length field may be set to a value that produces 0 in a modulo (or modular) operation with 3.

For the third embodiment, a frame structure of the EHT PPDU 2200 of FIG. 22 may be used. Hereinafter, an example in which a symbol (e.g., the Ind_symbol 2250) following the RL-SIG is configured for EHT packet classification may be described.

1. In the third embodiment, the symbol after the RL-SIG may include a symbol related to the EHT PPDU (or EHT packet). The symbol may be called variously. For example, the symbol may be referred to as an indication symbol (or a detection symbol). The indication symbol is for illustration, and the symbol may be called otherwise. Hereinafter, for convenience of description, the symbol may be referred to as an Ind_symbol (indication symbol).

2. According to an embodiment, BPSK constellation mapping may be applied to the Ind_symbol.

3. According to an embodiment, the Ind_symbol may be configured as a bit for information related to the packet and/or early indication information. According to an embodiment, the Ind_symbol may be configured with a sequence for indicating the information related to the packet and/or the early indication information. That is, the Ind_symbol may include the information related to the packet and the early indication information. For example, the Ind_symbol may be configured with bit information including the information related to the packet and the early indication information. In another example, the Ind_symbol may be configured with a sequence including the information related to the packet and the early indication information.

3-A. For example, an information bit included in the Ind_symbol (or one symbol) may include various types of information. An example of information included in the information bit may be described below.

3-A-i) Information related to packet indication

According to an embodiment, information related to packet indication may be set to two to four bits.

3-A-i-a) For an advanced system after the EHT standard (i.e., for future extension), the information related to the packet indication may be set to up to four bits. A STA transmitting the EHT PPDU (hereinafter, transmitting STA) may transmit the information related to the packet (or PPDU) using bits (two to four bits) including the information related to the packet indication.

3-Aib) Transmitting the information related to the packet indication first enables a STA receiving the EHT packet (or EHT PPDU) (hereinafter, receiving STA) to quickly determine which packet the received packet (or PPDU) is. Accordingly, it is possible to reduce power consumption of the receiving STA.

3-A-ii) Information related to BSS color

3-A-ii-a) The receiving STA may determine whether the received packet is a BSS packet or an OBSS packet.

3-A-ii-b) Information related to a BSS color may be configured as information of 6 to 11 bits.

3-A-ii-c) To enable the receiving STA to quickly conduct determination of an OBSS, the information related to the BSS color may be transmitted before the information related to the packet indication. Accordingly, when the information bit is configured, the information related to the BSS color may be positioned at the forefront.

3-A-iii) Information related to bandwidth (BW)

3-A-iii-a) To signaling overhead in using a wide bandwidth considered in a future extension and the EHT standard, the Ind_symbol (or information bit) may include information related to the wide bandwidth.

3-A-iii-b) The information related to the bandwidth (BW) information may be configured as information of one to two bits.

For example, the information related to the bandwidth (BW) may be configured as one-bit information. When the one-bit information is set to a first value (e.g., "0"), the one-bit information may refer to a bandwidth less than (or less than or equal to) 160 MHz. When the one-bit information is set to a second value (e.g., "1"), the one-bit information may refer to a bandwidth equal to or more than (or more than) 160 MHz.

In another example, the information related to the bandwidth (BW) may be configured as two-bit information. When the two-bit information is set to a first value (e.g., "00"), the 2-bit information may refer to a bandwidth of 160 MHz. When the two-bit information is set to a second value (e.g., "01"), the 2-bit information may refer to a bandwidth of 240 MHz. When the two-bit information is set to a third value (e.g., "10"), the 2-bit information may refer to a bandwidth of 320 MHz. A fourth value (e.g., "11") may be set as reserved.

3-A-iii) Information related to CRC and/or information related to parity bit

Information related to a CRC may be configured as four-bit information. Information related to a parity bit may be configured as one-bit information.

3-A-iii-a) The information bit may include a CRC or a parity bit, such as the L-SIG, for error detection on the information bit.

3-A-iii-b) The Ind_symbol (or information bit) may include a tail bit. The tail bit may be configured as six-bit information.

3-B. The Ind_symbol may include one OFDM symbol. The Ind_symbol may be positioned after the RL-SIG and before an EHT-SIG in the EHT frame (or EHT PPDU). That is, the Ind_symbol may be contiguous to the RL-SIG. The EHT-SIG may be contiguous to the Ind_symbol.

4. As described in the foregoing examples, it is possible to reduce false detection by legacy STAs by transmitting the Ind_symbol including the information related to the packet indication in the EHT frame.

4-A. When receiving the EHT PPDU, an 11n STA and an 11ac STA may receive two OFDM symbols modulated with BPSK after the L-SIG. The 11n STA and the 11ac STA may perform packet classification based on the two OFDM symbols.

For example, according to 802.11n, both of two symbols following an L-SIG in an 11n PPDU are set to QBPSK.

Therefore, the 11n STA may not determine the EHT PPDU as an 11n PPDU when performing a constellation mapping check.

For example, according to 802.11ac, two symbols following an L-SIG in an 11ac PPDU are set as BPSK and QBPSK. Therefore, the 11ac STA may not determine the EHT PPDU as an 11ac PPDU when performing a constellation mapping check.

Accordingly, it is possible to reduce false detection by the 11n STA and the 11ac STA.

4-B. In the 11ax STA, the EHT PPDU passes a repetition check but does not pass a content check. Specifically, in the EHT PPDU, the length field is set to a value divisible by 3, and thus the 11ax STA may not determine the EHT PPDU as an flax PPDU. Accordingly, it is possible to reduce false alarms by the 11ax STA.

4-C. The EHT STA may determine whether the received PPDU is an flax PPDU through a repetition check and a content check in the same manner as the 11ax STA. In addition, the EHT STA may determine whether the received PPDU is an EHT PPDU using the information related to the packet indication included in the Ind_symbol (indication symbol) following the RL-SIG.

5. For range extension or reliable sensitivity, the Ind_symbol may be configured with a signal that is repeated in terms of time or frequency within one symbol.

5-A. Example in which the Ind_symbol is configured with a signal repeated in terms of time 5-A-i) To configure the symbol with the same repeated signal within one symbol, the transmitting STA may transmit data through two-carrier (or subcarrier) spacing in terms of frequency.

5-A-ii) In this case, the information bit transmitted through the Ind_symbol may include a packet indication bit, a CRC, and a tail bit for the EHT PPDU (or EHT frame).

5-B. Example in which the Ind_symbol is configured with a signal repeated in terms of frequency 5-B-i) The Ind_symbol may be configured by applying dual carrier modulation applied to 802.11ax standard.

5-B-ii) In this case, the information bit transmitted through the Ind_symbol may include a packet indication bit, a CRC and a tail bit for the EHT PPDU (or EHT frame).

5-C. As described in the foregoing examples, the Ind_symbol following the RL-SIG may be configured with a symbol including a signal repeated in terms of time or frequency, thereby increasing reliability of the EHT PPDU.

6. Unlike the foregoing examples, the Ind_symbol may be configured with a signature sequence for packet indication.

6-A. The signature sequence may include a time sequence or a frequency sequence.

6-A-i) The transmitting STA may indicate information related to the packet using the signature sequence. That is, the signature sequence may include information related to the packet.

6-A-ii) The signature sequence may be configured with sequences between the Euclidean distance is long in order to reduce sequence detection errors. Here, the signature sequence may be configured using a sequence having a good correlation characteristic (e.g., a PN-sequence, an ML sequence, or an orthogonal sequence).

6-B. Since the Ind_symbol is configured using the signature sequence, the receiving STA may perform correlation detection and/or sequence detection through decoding on a symbol following the RL-SIG in a received signal. The receiving STA may determine whether the received signal is an EHT PPDU based on the correlation detection and/or the sequence detection.

Fourth Embodiment

According to a fourth embodiment, an EHT-SIG symbol may be transmitted after an RL-SIG in an EHT PPDU.

FIG. 23 illustrates another format of an EHT PPDU.

Referring to FIG. 23, an EHT PPDU 2300 may include an L-STF 2310, an L-LTF 2320, an L-SIG 2330, an RL-SIG 2340, an EHT-SIG 2350, an EHT-SIG 2360, an EHT-STF 2370, an EHT-LTF 2380, and/or an EHT-data 2390. The EHT PPDU 2300 may be related to the PPDU illustrated in FIG. 18. The EHT-SIG 2350 may be related to the U-SIG illustrated in FIG. 18.

According to an embodiment, the EHT-SIG 2350 may be positioned immediately after the RL-SIG 2340. That is, the EHT-SIG 2350 may be contiguous to the RL-SIG 2340. Symbols of the EHT-SIGs 2350 and 2360 may include packet indication information (or information related to packet indication). According to an embodiment, the number of symbols of the EHT-SIGs 2350 and 2360 is for illustration, and the number of symbols of the EHT-SIGs 2350 and 2360 may be variously set. For example, the number of symbols of the EHT-SIGs 2350 and 2360 may be three or more. Specifically, the EHT-SIG 2350 may be set to two symbols. In addition, the EHT-SIG 2360 may be set to at least one symbol.

For the fourth embodiment, a frame structure of the EHT PPDU 2300 of FIG. 23 may be used. Hereinafter, field information of the EHT PPDU according to the fourth embodiment may be described. The EHT-SIG to be described below may refer to at least one of the EHT-SIG 2350 and/or the EHT-SIG 2360 of FIG. 23.

1. In the EHT PPDU (or EHT frame), the value of a length field of the L-SIG and RL-SIG may be set to a value divisible by 3. That is, the value of the length field of the L-SIG and the RL-SIG may be set such that a result of applying "modulo 3" is 0.

2. The EHT-SIG may be configured by including the information related to the packet indication. The information related to the packet indication may be used for early detection in a receiving STA. One symbol of the EHT-SIG may include the information related to the packet indication for the early detection.

2-A. For example, an EHT SIGA included in the EHT-SIG may include "EHT-SIGA-early" configured with one OFDM symbol including the packet indication and "EHT-SIGA" including common information. In the EHT-SIG (or EHT SIGA), an information bit may be configured so that the information related to the packet indication may be positioned at the forefront.

2-B. The EHT-SIGA-early may be individually encoded and configured. The EHT-SIGA-early may be configured to include CRC/parity+tail bits. For example, the EHT-SIGA-early may include a CRC bit and a tail bit. In another example, the EHT-SIGA-early may include a parity bit and a tail bit.

2-C. The EHT-SIGA-early (or EHT-SIGA-early symbol) may be configured using the information included in the Ind_symbol in the third embodiment described above.

2-D. The EHT-SIGA-early may be configured by applying example 5 of the third embodiment described above. For example, the EHT-SIGA-early may be configured such that a signal is repeated in time or frequency for robust transmission or range extension.

According to the fourth embodiment, the EHT-SIGA-early transmitted immediately after the RL-SIG may be transmitted after being modulated through BPSK. Therefore, it is possible to reduce the probability of false detection by a legacy STA (e.g., 11n STA or 11ac STA). A data bit of the EHT-SIGA-early may be configured differently from the HE-SIGA field. For example, the data bit of the EHT-SIGA-early may be designed to have a long Euclidean distance from the HE-SIGA field. Therefore, when the 11ax STA decodes a symbol of the EHT-SIGA-early, it is possible to avoid an error of determining the EHT-SIGA-early as the HE-SIGA. That is, it is possible to reduce false detection by the 11ax STA.

Fifth Embodiment

Unlike the foregoing embodiments, in embodiments other than the first embodiment, the length field of the L-SIG may be set to a value such that the remainder obtained by dividing the length field by 3 is 1 or 2 as in the 802.11ax standard. Here, an 11ax STA and an EHT STA may perform packet detection through the following embodiment. Hereinafter, an example in which the remainder obtained by dividing the value of the length field of the L-SIG by 3 is set to 1 or 2 in the second to fourth embodiments will be described.

1. When the second embodiment is applied

According to the second embodiment, the RL-SIG may not have a structure in which the L-SIG is repeated. Therefore, the legacy STA and/or the EHT STA may distinguish a packet using a repetition check and a bit pattern or polarization of the RL-SIG.

1-A. For example, when receiving the EHT PPDU (EHT packet), the 11ax STA may perform a repetition check. The 11ax STA may determine that the L-SIG and the RL-SIG are not repeated based on the repetition check and may not decode the EHT PPDU.

1-B. For example, when receiving the EHT PPDU (EHT packet), the EHT STA may perform a repetition check using a sequence or polarization applied to the RL-SIG. When the L-SIG is repeated in the RL-SIG, the EHT STA may determine the EHT PPDU as an EHT PPDU.

2. When the third and fourth embodiments are applied

According to the third embodiment and/or the fourth embodiment, when receiving the EHT PPDU (or EHT packet), the 11ax STA may perform a repetition check and a content check. The 11ax STA may determine the received EHT PPDU as an 11ax PPDU. Accordingly, the 11ax STA may decode the EHT PPDU. The 11ax STA may determine a field after the RL-SIG as an HE-SIGA and may decode the field. However, in the EHT PPDU, a symbol following the RL-SIG is configured differently from the HE-SIGA. In the 11ax STA, the EHT PPDU may not pass a CRC check. Therefore, after failing to decode the HE-SIGA, the 11ax STA may set a NAV as long as the length (or time) of the EHT PPDU obtained/identified through the length field.

2-A. The EHT STA may perform a repetition check and a contention check in the same manner as the 11ax STA. The EHT STA may decode one symbol and may identify/obtain information related to packet indication. The EHT STA may determine whether a received signal is an EHT PPDU based on the information related to the packet indication.

2-B. Since both the 11ax STA and the EHT STA determine a packet (packet format) based on packet classification and data decoding according to 802.11ax, detection may take a longer time. In addition, unnecessary power consumption may occur.

Figure 24:
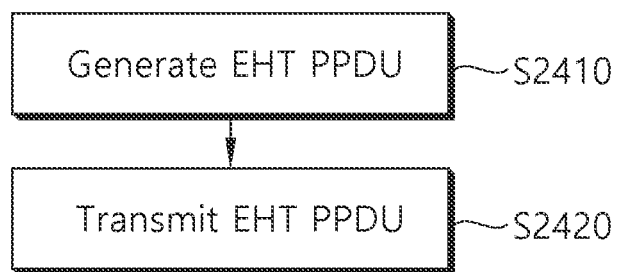
FIG. 24 is a flowchart illustrating an embodiment of an operation of a transmitting STA.

FIG. 24 is a flowchart illustrating an operation of a transmitting STA.

Referring to FIG. 24, in S2410, the transmitting STA (e.g., STAs 110 and 120) may generate an EHT PPDU. According to an embodiment, the EHT PPDU may include various fields. For example, the EHT PPDU may include an L-SIG field and a RL-SIG field. In one example, the RL-SIG field may be contiguous to the L-SIG field.

According to an embodiment, the RL-SIG field may be configured such that the L-SIG field is repeated. For example, the RL-SIG field includes the same information as the L-SIG field and may be modulated by the same method as the L-SIG field. BPSK modulation may be applied to the L-SIG field and the RL-SIG field.

In another example, the RL-SIG field may include the same information as the L-SIG field but may be configured differently therefrom. In an example, the RL-SIG field may be configured with complementary bits of bits forming the L-SIG field. In another example, the RL-SIG field may be configured with the result of an XOR operation of the bits forming the L-SIG field and a specific bit or sequence.

According to an embodiment, the transmitting STA may set the value of a length field of the L-SIG field based on the transmission time of the EHT PPDU. For example, the transmitting STA may set the value of the length field based on Equation 13 described above. For example, the result of applying "modulo 3" to the value of the length field of the L-SIG field may be set to "0".

According to an embodiment, the EHT PPDU may include a universal signal field. For example, the universal signal field may include a U-SIG. For example, the universal signal field may include control information related to the EHT PPDU.

In an example, the universal signal field may include information related to the type of the EHT PPDU. The universal signal field may include information indicating that the EHT PPDU is a PPDU based on the EHT standard. The information related to the type of the EHT PPDU may be configured as three-bit information.

In another example, the universal signal field may include information related to a basic service set (BSS) color or information related to a bandwidth.

In S2420, the transmitting STA may transmit the EHT PPDU. According to an embodiment, the transmitting STA may transmit the EHT PPDU to a receiving STA.

Figure 25:
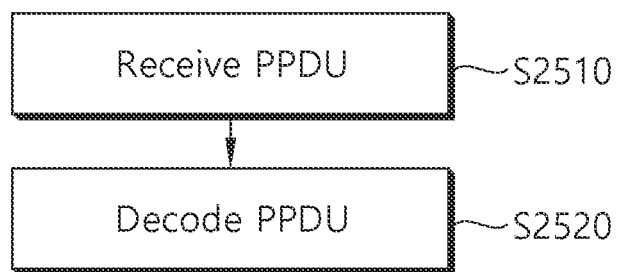
FIG. 25 is a flowchart illustrating an embodiment of an operation of a receiving STA.

FIG. 25 is a flowchart illustrating an operation of a receiving STA.

Referring to FIG. 25, in S2510, the receiving STA (e.g., STAs 110 and 120) may receive a PPDU. According to an embodiment, the PPDU may include an L-SIG field.

In S2520, the receiving STA may determine the type of the PPDU based on whether the L-SIG field is repeated and a "modulo 3 operation" with respect to the value of a length field.

According to an embodiment, the type of the PPDU may include a legacy type, an HE type, and an EHT type. The PPDU of the legacy type may be a legacy PPDU. The PPDU of the HE type may be an HE PPDU. The PPDU of the EHT type may be an EHT PPDU.

According to an embodiment, the PPDU of the EHT type may include an RL-SIG field in which the L-SIG field is repeated. The RL-SIG field may be contiguous to the L-SIG. The RL-SIG field may include the same information field as the L-SIG field.

According to an embodiment, the receiving STA may determine/detect whether the L-SIG field is repeated. The receiving STA may determine the type of the PPDU based on whether the L-SIG field is repeated. For example, to determine whether the L-SIG field is repeated, the receiving STA may determine whether the L-SIG field and the RL-SIG field are the same.

For example, the L-SIG field may not be repeated in the received PPDU. When the L-SIG field is not repeated, the PPDU received by the receiving STA may be determined as a legacy-type PPDU (legacy PPDU).

For example, the L-SIG field may be repeated in the received PPDU. That is, the L-SIG field and the RL-SIG field may be identically set. When the L-SIG field is repeated, the PPDU received by the receiving STA may be determined as an HE-type PPDU (HE PPDU) or an EHT-type PPDU (EHT PPDU).

In an example, the RL-SIG field may include the same information as the L-SIG field and may be modulated by the same method as the L-SIG field. BPSK modulation may be applied to the L-SIG field and the RL-SIG field.

In another example, the RL-SIG field may include the same information as the L-SIG field but may be configured differently therefrom. In an example, the RL-SIG field may be configured with complementary bits of bits forming the L-SIG field. In another example, the RL-SIG field may be configured with the result of an XOR operation of the bits forming the L-SIG field and a specific bit or sequence.

The legacy-type PPDU (legacy PPDU) may refer to PPDUs of various standards. For example, the legacy PPDU may include a non-high throughput (non-HT) PPDU, a high throughput (HT) PPDU, or a very high throughput (VHT) PPDU.

According to an embodiment, the receiving STA may determine the type of the PPDU based on the "modulo 3 operation" with respect to the value of the length field. For example, the value of the length field may be set based on the transmission time of the PPDU. In one example, the value of the length field may be set based on Equation 13 described above.

For example, the PPDU may be determined as an HE PPDU in which the result of the "modulo 3 operation" has a value of "1" or "2". That is, the type of the PPDU may be determined as the HE type of a PPDU in which the result of the "modulo 3 operation" is "1" or In another example, the PPDU may be determined as an EHT PPDU in which the result of the "modulo 3 operation" is "0". That is, the type of the PPDU may be determined as the HE type for a PPDU in which the result of the "modulo 3 operation" is "0".

According to an embodiment, the receiving STA may perform the "modulo 3 operation" with respect to the value of the length field. For example, the receiving STA may identify that the result of the operation is "0". The receiving STA may identify that the received PPDU is an EHT PPDU based on the result of the "modulo 3" operation. That is, the receiving STA may identify that the type of the received PPDU is the EHT type based on the result of the "modulo 3" operation. In another example, the receiving STA may identify that the result of the operation is "1" or "2". The receiving STA may identify that the received PPDU is an HE PPDU based on the result of the "modulo 3 operation". That is, the receiving STA may identify that the type of the received PPDU is the HE type based on the result of the "modulo 3" operation.

According to an embodiment, the received PPDU may include a universal signal field. For example, the EHT PPDU may include the universal signal field. For example, the universal signal field may include a U-SIG. For example, the universal signal field may include control information related to the PPDU.

In an example, the universal signal field may include information related to the type of the PPDU. The universal signal field may include information indicating that the PPDU is a PPDU based on the EHT standard. The information related to the type of the PPDU may be configured as three-bit information.

In another example, the universal signal field may include information related to a basic service set (BSS) color or information related to a bandwidth.

In S2530, the receiving STA may decode the PPDU. According to an embodiment, the receiving STA may determine the received PPDU as an EHT PPDU. That is, the receiving STA may determine the type of the received PPDU as the EHT type. The receiving STA may decode the received PPDU based on the EHT type.

The foregoing technical features of the present specification may be applied to various devices and methods. For example, the foregoing technical features of the present specification may be performed/supported through the apparatus of FIG. 1 and/or FIG. 19. For example, the foregoing technical features of the present specification may be applied to only part of FIG. 1 and/or FIG. 19. For example, the foregoing technical features of the present specification may be implemented based on the processing chips 114 and 124 of FIG. 1, may be implemented based on the processors 111 and 121 and the memories 112 and 122 of FIG. 1, or may be implemented based on the processor 610 and the memory 620 of FIG. 19. For example, an apparatus of the present specification may be configured to: receive a physical protocol data unit (PPDU) including an L-SIG field; determine the type of the PPDU based on whether the L-SIG field is repeated and a "modulo 3 operation" with respect to the value of a length field, the PPDU being determined as an extreme high throughput (EHT) PPDU in which the result of the "modulo 3 operation" is "0", and the PPDU of an EHT type including an RL-SIG field in which the L-SIG field is repeated; and decode the PPDU.

The technical features of the present specification may be implemented based on a computer-readable medium (CRM). For example, the CRM proposed according to the present specification may store instructions to perform operations including: receiving a physical protocol data unit (PPDU) including an L-SIG field and an RL-SIG field, the type of the PPDU being determined based on whether the L-SIG field is repeated and a "modulo 3 operation" with respect to the value of a length field, the PPDU being determined as an extreme high throughput (EHT) PPDU in which the result of the "modulo 3 operation" is "0", and the PPDU of an EHT type including the RL-SIG field in which the L-SIG field is repeated; and decoding the PPDU. The instructions stored in the CRM of the present specification may be executed by at least one processor. The least one processor related to the CRM of the present specification may be the processors 111 and 121 or the processing chips 114 and 124 of FIG. 1 or may be the processor 610 of FIG. 19. The CRM of the present specification may be the memories 112 and 122 of FIG. 1, may be the memory 620 of FIG. 19, or may be a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a station (STA) in a wireless local area network system, the method comprising:
   receiving a physical protocol data unit (PPDU) comprising a legacy-signal (L-SIG) field;
   determining whether the PPDU comprises a repeated L-SIG (RL-SIG) field which is a repeat of the L-SIG field, wherein the RL-SIG is contiguous to the L-SIG field; and
   after determining that the PPDU comprises the RL-SIG field, determining whether a length field included in the L-SIG field is set to a value satisfying a condition that a remainder is zero when a value of the length field is divided by three (3), wherein the remainder is used to differentiate an extreme high throughput (EHT) PPDU from a high efficiency (HE) PPDU,
   wherein the PPDU is determined as the EHT PPDU based on the remainder having a value of zero (0), and the PPDU is determined as the HE PPDU based on the remainder having a non-zero value.

2. The method of claim 1, further comprising:
   after determining the length field is set to the value satisfying the condition, evaluating a physical version field comprised in a universal signal (U-SIG) field of the PPDU, wherein the physical version field has a length of three (3) bits.

3. The method of claim 2, wherein the universal signal (U-SIG) field further comprises information related to a basic service set (BSS) color of the PPDU and/or information related to a bandwidth of the PPDU.

4. The method of claim 1, wherein binary phase shift keying (BPSK) modulation is applied to the L-SIG field and the RL-SIG field.

5. The method of claim 1, wherein the value of the length field is related to a transmission time of the PPDU.

6. The method of claim 1, wherein the STA is an access point (AP) STA or a non-AP STA.

7. A station (STA) in wireless local area network (WLAN) system, the receiving STA comprising:
   a transceiver to transmit and receive a wireless signal; and
   a processor coupled to the transceiver, wherein the processor is adapted to:
  receive a physical protocol data unit (PPDU) comprising a legacy-signal (L-SIG) field;
  determine whether the PPDU comprises a repeated L-SIG (RL-SIG) field which is a repeat of the L-SIG field, wherein the RL-SIG is contiguous to the L-SIG field; and
  after determining that the PPDU comprises the RL-SIG field, determine whether a length field included in the L-SIG field is set to a value satisfying a condition that a remainder is zero when a value of the length field is divided by three (3), wherein the remainder is used to differentiate an extreme high throughput (EHT) PPDU from a high efficiency (HE) PPDU,
wherein the PPDU is determined as the EHT PPDU based on the remainder having a value of zero (0), and the PPDU is determined as the HE PPDU based on the remainder having a non-zero value.

8. The STA of claim 7, wherein the processor is further adapted to:
  after determining the length field is set to the value satisfying the condition, evaluate a physical version field comprised in a universal signal (U-SIG) field of the PPDU, wherein the physical version field has a length of three (3) bits.

9. The STA of claim 8, wherein the universal signal (U-SIG) field further comprises information related to a basic service set (BSS) color of the PPDU and/or information related to a bandwidth of the PPDU.

10. The STA of claim 7, wherein binary phase shift keying (BPSK) modulation is applied to the L-SIG field and the RL-SIG field.

11. The STA of claim 7, wherein the value of the length field is related to a transmission time of the PPDU.

12. The STA of claim 7, wherein the STA is an access point (AP) STA or a non-AP STA.

* * * * *